Patented Jan. 29, 1935

1,989,567

UNITED STATES PATENT OFFICE 1,989,567

CHROMIFEROUS AZO-DYESTUFF AND PROCESS OF MAKING SAME

Fritz Straub, Basel, and Hermann Schneider, Riehen, near Basel, Switzerland, assignors to Society of Chemical Industry in Basle, Basel, Switzerland No Drawing. Application March 19, 1934, Serial No. 716,428. In Switzerland March 31, 1933

12 Claims. (Cl. 260—12)

This invention relates to the manufacture of chromiferous azo-dyestuffs by treating in acid medium mixtures consisting of chromium compounds of azo-dyestuffs and chromable azo-dyestuffs, which mixtures contain at least one chromium compound of an azo-dyestuff of the general formula

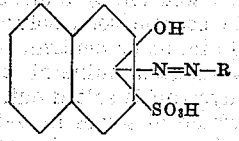

wherein the hydroxyl- and the azo-group are in ortho-position to each other, and R represents a naphthol radical as well as at least one azo-dyestuff of the above general formula.

The mixture of chromium compounds of azo-dyestuffs and chromable azo-dyestuffs which serve as parent material for the invention must merely fulfill the condition that they contain at least one chromium compound of an azo-dyestuff of the above general formula which may be present as a mixed chromium compound with any other azo-dyestuff as well as at least one azo-dyestuff of the above general formula as, for example, the azo-dyestuff from diazotized 2-amino-1-hydroxynaphthalene-4-sulfonic acid or from diazotized 1-amino-2-hydroxynaphthalene-4-sulfonic acid and 1- or 2-hydroxynaphthalene or a substitution product of such hydroxynaphthalenes, such as chlorohydroxynaphthalene, bromohydroxynaphthalene, methylhydroxynaphthalene and alkoxyhydroxynaphthalene. In addition the mixtures may contain the various chromed and chromable mono-, dis- and poly-azo-dyestuffs which are obtainable for example from a diazotized aromatic amine of the benzene or naphthalene series and any coupling component, for example an arylamine, a phenol or a compound whose carbon atom, capable of coupling, belongs to a heterocyclic ring or to an open chain; coupling components whose carbon atom, capable of coupling, belongs to a heterocyclic ring are, for example, pyrazolones, hydroxyquinolines and barbituric acids whilst aceto-acetic acid derivatives and benzoyl acetic orthocarboxylic acids are coupling components whose carbon atom, capable of being coupled, belongs to an open chain.

The chromium compounds of azo-dyestuffs present in the mixtures may be produced by chroming the said azo-dyestuffs by any of the various known processes and with various chroming agents; such processes are, for example, chroming with an agent yielding chromium in an acid, neutral or alkaline medium in an open vessel or under pressure, in presence or absence of a suitable addition such as, for example, an organic acid or an inorganic acid or soluble salt thereof, or another substance such as an organic solvent.

The mixture to be used by the invention may contain only one chromium compound of an azo-dyestuff such as, for instance, the chromium compound of the azo-dyestuff from diazotized 1-amino-2-hydroxynaphthalene-4-sulfonic acid and 2-hydroxynaphthalene and only one chromable azo-dyestuff such as, for instance, the azo-dyestuff from diazotized 1-amino-2-hydroxynaphthalene-4-sulfonic acid and 2-hydroxynaphthalene or only one chromium compound from an azo-dyestuff and two or more chromable azo-dyestuffs or two or more chromium compounds of azo-dyestuffs and only one chromable azo-dyestuff or two or more chromium compounds of azo-dyestuffs and two or more chromable azo-dyestuffs. Furthermore, the chromium compounds present in the mixture may be derived from the same chromable azo-dyestuffs present in the mixture or they may be different or they may be chromium compounds derived from the different chromable azo-dyestuffs.

The proportion between the chromium compounds and the chromable azo-dyestuffs present in the mixture may vary within wide limits; furthermore, there may be used for the invention a mixture which has been made not from isolated chromium compounds but by use of chroming solutions or suspensions.

The treatment of the mixture of chromium compounds of azo-dyestuffs and chromable azo-dyestuffs in acid medium may be such that the mixture is heated in presence of water or in presence of water and an organic solvent or suspension agent which is miscible with water, for instance, an alcohol with addition of an acid such as, for instance, hydrochloric acid, sulfuric acid, formic acid, acetic acid, oxalic acid, propionic acid, benzene sulfonic acid, a naphthalene disulfonic acid, lactic acid or tartaric acid, in an open vessel or under pressure and in presence or absence of another suitable substance, for example, a soluble inorganic or organic salt or another substance. The treatment in acid medium may even occur in the dye-bath.

Particularly valuable products in respect of the dyeing behavior of the dyestuff obtained are attained when the parent material is a mixture which contains a chromium compound of the azo-dyestuff of the general formula given above and the same azo-dyestuff in unchromed condition alone or these two dyestuffs in preponderating proportion; for, in this manner, there are produced dyestuffs which dye navy blue and, as contrasted with the known dyestuffs of this group, which dye similar tints, dye uniformly in deep tones and are fast in every respect.

The chromium compounds obtainable by the invention are characterized by very good solubility in water; they are suitable for dyeing animal fibers and particularly wool and indeed they can be used in dyeing by the process of Patent 1,903,884 or from dye-baths containing an aromatic acid besides an inorganic acid. They dye blue to black tints and the dyeings are very fast.

The following examples illustrate the invention, the parts being by weight:—

*Example 1*

41.6 parts of the azo-dyestuff of the formula

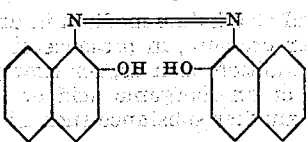

from diazotized 1-amino-2-hydroxynaphthalene-4-sulfonic acid and 2-hydroxynaphthalene are suspended in 600 parts of water and after addition of a chromium formate solution corresponding with 9.1 parts of $Cr_2O_3$ the whole is boiled in a reflux apparatus for 8–9 hours.

The insoluble chromium compound thus formed is filtered, well washed and then suspended in 800 parts of water together with 13.1 parts of the azo-dyestuff from diazotized 1-amino-2-hydroxynaphthalene-.4 - sulfonic acid and 2-hydroxynaphthalene.

There are then added 20 parts of acetic acid of 85 per cent. strength and the whole is boiled in a reflux apparatus until no unchromed azo-dyestuff is to be detected (this can be ascertained by filtering a sample of the reaction mixture diluted with hot water, and dissolving the residue remaining on the filter in warm caustic soda solution. When acidifying this solution no change of color to red must occur). The dyestuff is then dissolved by adding dilute caustic soda solution and the solution is neutralized with acetic acid and evaporated to dryness in a vacuum.

The chromed dyestuff thus obtained dyes in an acid bath navy blue tints of surprising fastness.

*Example 2*

60 parts of a chromium compound made in alkaline medium from the azo-dyestuff of the formula

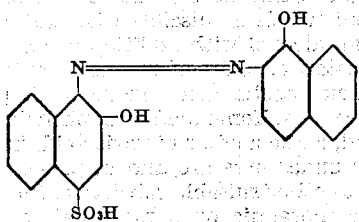

from diazotized 1-amino-2-hydroxynaphthalene-4-sulfonic acid and 1-hydroxynaphthalene are stirred in 600 parts of water together with 10.4 parts of the said azo-dyestuff but in unchromed condition and 50 parts of sulfuric acid of 10 per cent. strength and the whole is boiled for a long time in a reflux apparatus. After cooling, the greater part of the new chromiferous dyestuff is in suspension; it is dissolved by adding a little caustic soda solution, the solution is filtered of a small quantity of impurities and the dyestuff is precipitated by addition of common salt and neutralization of the solution; it is then filtered.

When dry, the dyestuff thus produced is a violettish black powder which dissolves in water freely to a blue solution with a red dichroism, in sodium carbonate solution of 10 per cent. strength sparingly to a blue solution, in caustic soda solution of 10 per cent. strength to a red-violet solution and in concentrated sulfuric acid to a blackish green solution. In a bath acid with organic acid and mineral acid it dyes wool fast navy blue tints.

*Example 3*

60 parts of the chromium compound of the azo-dyestuff from diazotized 1-amino-2-hydroxynaphthalene-4-sulfonic acid and 1-hydroxynaphthalene and 10.4 parts of the same dyestuff in unchromed condition are stirred with 600 parts of water and after addition of 10 parts of acetic acid of 85 per cent. strength the whole is boiled for a long time in a reflux apparatus; after cooling, the dyestuff suspension thus produced is converted into a solution by addition of about 20 parts of dilute caustic soda solution; the solution is filtered and after neutralizing the filtrate with strongly diluted mineral acid the new chromiferous dyestuff is salted out. It is a blue-grey powder which dissolves in water easily to a blue solution, in sodium carbonate solution of 10 per cent. strength sparingly to a blue solution and in caustic soda solution of 10 per cent. strength also sparingly to a red-violet solution, in concentrated sulfuric acid it dissolves to a blackish green solution.

The dyestuff dyes wool in a bath acid with organic acid and sulfuric acid navy blue tints of good fastness.

*Example 4*

60 parts of a complex chromium compound produced in alkaline medium from the azo-dyestuff from diazotized 1-amino-2-hydroxynaphthalene-4-sulfonic acid and 2-hydroxynaphthalene and 10.4 parts of the same dyestuff but in unchromed condition are stirred together in 800 parts of water; there are then added 150 parts of an aqueous dilution of 10.7 per cent. strength of benzene sulfonic acid and the whole is boiled for a long time in a reflux apparatus. The dyestuff suspension thus obtained is converted into solution by addition of dilute caustic soda solution; the solution is filtered and after neutralization with dilute acetic acid the dyestuff is salted out from the filtrate, after drying the dyestuff is a violet-black powder which dissolves easily in water to a blue solution having strong red dichroism. Sodium carbonate solution of 10 per cent. strength dissolves the dyestuff very sparingly to a blue solution and in caustic soda solution of 10 per cent. strength it is also very sparingly soluble to a red-violet solution, in concentrated sulfuric acid it dissolves to a blue solution. The dyestuff dyes wool in a bath acid with organic acid and sulfuric acid navy blue tints of excellent fastness.

*Example 5*

60 parts of a chromium compound produced in alkaline medium from the azo-dyestuff from diazotized 1-amino-2-hydroxynaphthalene-4-sulfonic acid and 2-hydroxynaphthalene and 14 parts of the same dyestuff but in unchromed condition are suspended in 900 parts of water, 8 parts of tartaric acid are added and the mixture is boiled for a long time in the reflux apparatus. The suspension of the new chromiferous dyestuff thus produced is converted into a solution by adding dilute caustic soda solution, common salt is added and the chromium compound precipitated by cautious neutralization of sulfuric acid of 5 per cent. strength. After filtering and drying the dyestuff is a violet-black powder which dissolves freely in water to a blue solution having red dichroism, in sodium carbonate solution of 10 per cent. strength sparingly to a blue solution, in caustic soda solution of 10 per cent. strength also sparingly to a red-violet solution and in concentrated sulfuric acid to a blackish blue solution. The dyestuff dyes wool in a bath acid with organic acid and sulfuric acid navy blue tints of excellent fastness.

Example 6

60 parts of a mixed complex chromium compound obtained by boiling with chromium formate solution equal parts of the azo-dyestuff from diazotized 1-amino-2-hydroxynaphthalene-4-sulfonic acid and 1-hydroxynaphthalene and diazotized 1-amino-2-hydroxynaphthalene-4-sulfonic acid and 2-hydroxynaphthalene are suspended in 800 parts of water, there are then added 5.2 parts each of the same azo-dyestuffs but in unchromed condition as well as 5.4 parts of formic acid of 85 per cent. strength and the whole is boiled for a long time in a reflux apparatus.

After cooling, the dyestuff suspension is converted into a solution by addition of dilute caustic soda solution, this solution is filtered and neutralized with strongly diluted sulfuric acid whereupon the new chromiferous dyestuff is salted out, it is a violet-black powder easily soluble in water to a blue solution of strong red dichroism; it also dissolves in sodium carbonate solution of 10 per cent. strength and in caustic soda solution of 10 per cent. strength to red-violet solutions and in concentrated sulfuric acid solution to blackish blue-green solutions. It dyes wool in a bath acid with organic acid and sulfuric acid fast navy blue tints.

Example 7

40 parts of a chromium compound obtained in alkaline medium from the azo-dyestuff from diazotized 1-amino-2-hydroxynaphthalene-4-sulfonic acid and 2-hydroxynaphthalene are introduced together with 8.32 parts of the azo-dyestuff from diazotized 1-amino-2-hydroxynaphthalene-4-sulfonic acid and 1-hydroxynaphthalene and with 8.9 parts of the azo-dyestuff of the formula

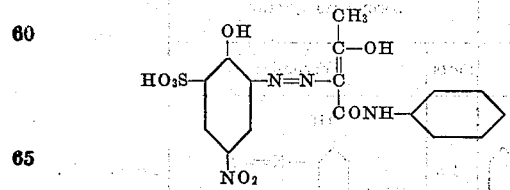

from diazotized 4-nitro-2-amino-1-hydroxybenzene-6-sulfonic acid and acetic acid anilide into 600 parts of water. 4 parts of tartaric acid are added and the mixture is boiled for several hours in a reflux apparatus. After cooling, the mass is made alkaline with caustic soda solution, filtered, neutralized with dilute acetic acid and evaporated in a vacuum to dryness. There is obtained the new chromiferous dyestuff in the form of a black powder which dissolves in water, sodium carbonate solution of 10 per cent. strength and caustic soda solution of 10 per cent. strength to grey solutions which are strongly red dichroic. It dyes wool in a bath acid with organic acid and sulfuric acid olive-black tints of good fastness.

Example 8

30 parts of a mixed complex chromium compound made in acid medium, and containing 20 parts of the azo-dyestuff from diazotized 1-amino-2-hydroxynaphthalene-4-sulfonic acid and 2-hydroxynaphthalene as well as 10 parts of the azo-dyestuff of the formula

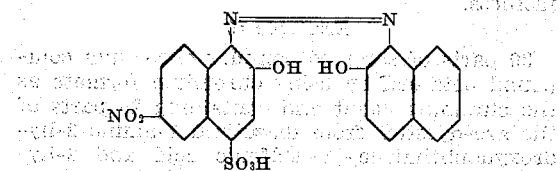

from nitrated 1-diazo-2-hydroxynaphthalene-4-sulfonic acid and 2-hydroxynaphthalene, are suspended together with 16.6 parts of the azo-dyestuff from diazotized 1-amino-2-hydroxynaphthalene-4-sulfonic acid and 1-hydroxynaphthalene in 500 parts of water. The whole is acidified with 30 parts of a solution of 10 per cent. strength of benzene sulfonic acid and boiled in a reflux apparatus for several hours. After cooling, are added about 25 parts of caustic soda solution of 30 per cent. strength, the solution is filtered, neutralized with strongly diluted sulfuric acid mixed with common salt to precipitate the new chromiferous dyestuff. The latter is obtained in the form of a violettish black powder which dissolves in water to a blue solution in sodium carbonate solution of 10 per cent. strength to a violet solution and in caustic soda solution of 10 per cent. strength to a red-violet solution. It dissolves in concentrated sulfuric acid to a blackish green-blue solution. It dyes wool in a bath acid with organic and sulfuric acids dark navy blue tints of excellent fastness.

Example 9

30 parts of a complex chromium compound obtained in acid medium and containing 20 parts of the acid dyestuff of diazotized 1-amino-2-hydroxynaphthalene-4-sulfonic acid and 2-hydroxynaphthalene as well as 10 parts of the azo-dyestuff from nitrated 1-diazo-2-hydroxynaphthalene-4-sulfonic acid and 2-hydroxynaphthalene are suspended in 400 parts of water containing 4 parts of propionic acid. There are then added 8.32 parts of the azo-dyestuff of the diazotized 1-amino-2-hydroxynaphthalene-4-sulfonic acid and 2-hydroxynaphthalene, 8.94 parts of the azo-dyestuff of the formula

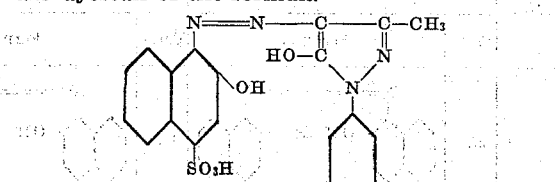

from diazotized 1-amino-2-hydroxynaphthalene-4-sulfonic acid and 1-phenyl-3-methyl-5-pyrazolone and the whole is heated in a reflux apparatus whilst stirring until no unchromed dyestuff can be detected (this can be ascertained by filtering a sample of the reaction mixture diluted with hot water, and dissolving the residue remaining on the filter in warm caustic soda solution. When acidifying this solution no change of color to red must occur). After cooling, caustic soda solution of 10 per cent. strength is added until everything is dissolved, the solution is filtered and neutralized with strongly diluted hydrochloric acid prior to salting out the chromiferous dyestuff. When dry the dyestuff is a violet-black powder dissolving freely in water, sodium carbonate solution of 10 per cent. strength and caustic soda solution of 10 per cent. strength to blackish violet solutions of red dichroism. It dyes wool in a bath acid with organic acid and sulfuric acid reddish navy blue tints of very good fastness.

Example 10

30 parts of a mixed complex chromium compound obtained by using chromium formate as the chroming agent and containing 20 parts of the azo-dyestuff from diazotized 1-amino-2-hydroxynaphthalene-4-sulfonic acid and 2-hydroxynaphthalene as well as 10 parts of the azo-dyestuff from nitrated 1-diazo-2-hydroxynaphthalene-4-sulfonic acid and 2-hydroxynaphthalene are suspended in 500 parts of water. 8.32 parts of the azo-dyestuff from diazotized 1-amino-2-hydroxynaphthalene-4-sulfonic acid and 1-hydroxynaphthalene as well as 7.6 parts of the azo-dyestuff of the formula

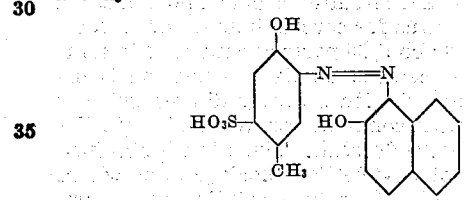

from diazotized 2-amino-1-hydroxy-4-methyl-benzene-5-sulfonic acid and 2-hydroxynaphthalene and the mixture is acidified by addition of 2 parts of formic acid of 85 per cent. strength and then boiled in a reflux apparatus whilst stirring until no unchromed dyestuff can be detected (this can be ascertained by filtering a sample of the reaction mixture diluted with hot water, and dissolving the residue remaining on the filter in warm caustic soda solution. When acidifying this solution no change of color to red must occur). After cooling, the dyestuff is dissolved by addition of caustic soda solution, the solution is filtered and, after neutralization with dilute formic acid, evaporated to dryness. The new chromiferous dyestuff is thus obtained in the form of a violet-black powder which dissolves in water to a blue-violet solution of red dichroism and in sodium carbonate solution or caustic soda solution, both of 10 per cent. strength, to a violet solution. It dyes wool in a bath acid with organic acid and sulfuric acid navy blue tints of very good fastness.

Example 11

28 parts of a chromium compound made in acid medium from the azo-dyestuff from diazotized 1-amino-2-hydroxynaphthalene-4-sulfonic acid and 2-hydroxynaphthalene and 8.32 parts of the azo-dyestuff of the formula

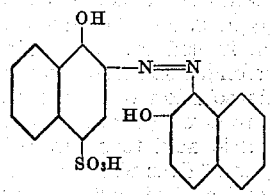

from diazotized 2-amino-1-hydroxynaphthalene-4-sulfonic acid and 2-hydroxynaphthalene as well as 5.4 parts of the azo-dyestuff of the formula

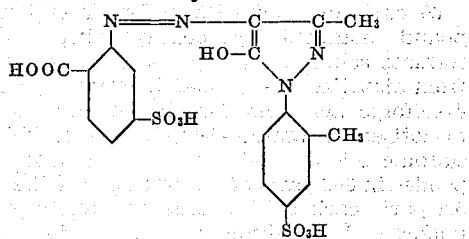

from diazotized 2-amino-4-sulfo-benzene carboxylic acid and 1-(2'-methyl-4'-sulfo)-phenyl-3-methyl-5-pyrazolone are suspended together in 450 parts of water in which there are two parts of sulfuric acid of 96 per cent. strength. This mixture is boiled for several hours in a reflux apparatus whilst stirring; the dyestuff is dissolved in the cooled mixture by addition of about 25 parts of caustic soda solution of about 30 per cent. strength. The solution is filtered and evaporated to dryness in a vacuum after neutralization with dilute acetic acid. The new chromium compound is thus obtained in the form of a violet-black powder which dissolves in water to a blue-black solution strongly red dichroic, in sodium carbonate solution of 10 percent. strength and also in caustic soda solution of 10 per cent. strength to reddish blue-black solutions.

It dyes wool in a bath acid with organic acid and sulfuric acid greenish black tints of good fastness.

The following table sets forth a number of other chromiferous azo-dyestuffs obtainable by this invention and dyeing wool blue to navy blue tints:—

| No. | Chromium compound of the azo-dyestuff | | First azo-dyestuff | | Second azo-dyestuff | | Acid |
|---|---|---|---|---|---|---|---|
| | Parts | Formula | Parts | Formula | Parts | Formula | |
| 1 | 27.5 | (structure) | 10.4 | (structure) | 4.8 | (structure) | Formic acid. |
| 2 | 30 | (structure) | 10.4 | do | 4.8 | do | Do. |

| No. | Chromium compound of the azo-dyestuff | | First azo-dyestuff | | Second azo-dyestuff | | Acid |
|---|---|---|---|---|---|---|---|
| | Parts | Formula | Parts | Formula | Parts | Formula | |
| 3 | 27.5 | [structure] | 7.8 | [structure] | 7.6 | [structure] | Acetic acid. |
| 4 | 30 | [structure] | 7.8 | do | 7.6 | do | Do. |
| 5 | 30 | [structure] | 10.4 | [structure] | 7 | [structure] | Do. |
| 6 | 35 | [structure] | 10.4 | do | 11.5 | do | Do. |
| 7 | 36 | [structure] | 8.32 | [structure] | 3.15 | [structure] | Do. |
| 8 | 27.5 | do | 8.32 | [structure] | 4.61 | [structure] | Do. |
| 9 | 30 | [structure] | 8.32 | [structure] | 3.15 | [structure] | Do. |
| 10 | 28 | [structure] | 12.5 | [structure] | 4.5 | [structure] | Formic acid. |
| 11 | 30 | [structure] | 12.5 | do | 4.5 | do | Do. |
| 12 | 33 | [structure] | 12.5 | [structure] | 5.5 | [structure] | Do. |

| No. | Chromium compound of the azo-dyestuff Parts | Chromium compound of the azo-dyestuff Formula | First azo-dyestuff Parts | First azo-dyestuff Formula | Second azo-dyestuff Parts | Second azo-dyestuff Formula | Acid |
|---|---|---|---|---|---|---|---|
| 13 | 33 | [naphthol-azo-naphthol with $SO_3H$] | 12.5 | [amino-naphthol azo naphthol with $SO_3H$] | 5.5 | [HN-$CH_2$-$SO_3H$ substituted amino naphthol azo naphthol with $SO_3H$] | Formic acid. |
| 14 | 29 | [dinaphthol-azo with $SO_3H$] | 8.32 | [naphthol-azo-naphthol with $SO_3H$] | 10.4 | [chloro-dihydroxy-benzene azo dihydroxy naphthalene with $HO_3S$ and $SO_3H$] | Lactic acid. |
| 15 | 30 | [naphthol-azo-naphthol with $SO_3H$] | 8.32 | ....do.................... | 10.4 | ......do........ | Do. |
| 16 | 30 | ......do................... | 8.3 | [naphthol-azo-naphthol with $SO_3H$ and HO] | 5.4 | [COOH-benzene-$SO_3H$ azo pyrazolone $CH_3$ with phenyl] | Sulfonic acid. |

What we claim is:—

1. Process for the manufacture of chromiferous azo-dyestuffs, consisting in reacting in acid medium mixtures of chromium compounds of azo-dyestuffs and chromable azo-dyestuffs, which mixtures contain at least one chromium compound of an azo-dyestuff of the general formula

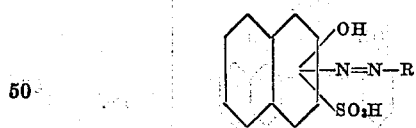

wherein the hydroxyl- and the azo-group are in ortho-position to each other and R represents a naphthol radical, as well as at least one azo-dyestuff of the above general formula.

2. Process for the manufacture of chromiferous azo-dyestuffs, consisting in reacting in acid medium mixtures of chromium compounds of azo-dyestuffs and chromable azo-dyestuffs, which mixtures contain a chromium compound of an azo-dyestuff of the general formula

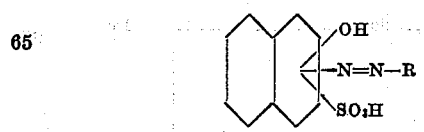

wherein the hydroxyl- and the azo-group are in ortho-position to each other and R represents a naphthol radical, as well as an azo-dyestuff of the above general formula.

3. Process for the manufacture of chromiferous azo-dyestuffs, consisting in reacting in acid medium mixtures of chromium compounds of azo-dyestuffs and chromable azo-dyestuffs, which mixtures contain a chromium compound of an azo-dyestuff of the general formula

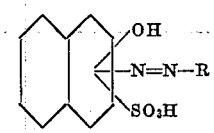

wherein the hydroxyl- and the azo-group are in ortho-position to each other and R represents an unsubstituted naphthol radical, as well as an azo-dyestuff of the above general formula.

4. Process for the manufacture of chromiferous azo-dyestuffs, consisting in reacting in acid medium mixtures of chromium compounds of azo-dyestuffs and chromable azo-dyestuffs, which mixtures contain a chromium compound of an azo-dyestuff of the general formula

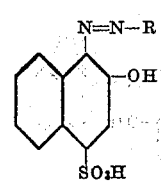

wherein R represents an unsubstituted naphthol radical, as well as an azo-dyestuff of the above general formula.

5. Process for the manufacture of chromiferous azo-dyestuffs, consisting in reacting in acid medium mixtures of chromium compounds of azo-dyestuffs and chromable azo-dyestuffs, which mixtures contain a chromium compound of the azo-dyestuff of the formula

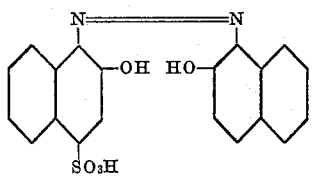

as well as the azo-dyestuff of this formula.

6. Process for the manufacture of chromiferous azo-dyestuffs, consisting in reacting with aliphatic acids mixtures of chromium compounds of azo-dyestuffs and chromable azo-dyestuffs, which mixtures contain a chromium compound of the azo-dyestuff of the formula

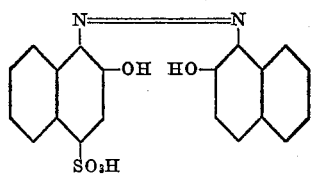

as well as the azo-dyestuff of this formula.

7. Chromiferous azo-dyestuffs obtained by reacting in acid medium mixtures of chromium compounds of azo-dyestuffs and chromable azo-dyestuffs, which mixtures contain at least one chromium compound of an azo-dyestuff of the general formula

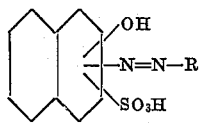

wherein the hydroxyl- and the azo-group are in ortho-position to each other and R represents a naphthol radical, as well as at least one azo-dyestuff of the above general formula, which products represent dark colored powders easily soluble in water and dyeing wool blue to black tints.

8. Chromiferous azo-dyestuffs obtained by reacting in acid medium mixtures of chromium compounds of azo-dyestuffs and chromable azo-dyestuffs, which mixtures contain a chromium compound of an azo-dyestuff of the general formula

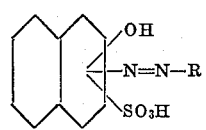

wherein the hydroxyl- and the azo-group are in ortho-position to each other and R represents a naphthol radical, as well as an azo-dyestuff of the above general formula, which products represent dark colored powders easily soluble in water and dyeing wool blue to black tints.

9. Chromiferous azo-dyestuffs obtained by reacting in acid medium mixtures of chromium compounds of azo-dyestuffs and chromable azo-dyestuffs, which mixtures contain a chromium compound of an azo-dyestuff of the general formula

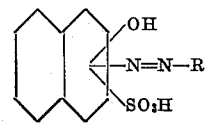

wherein the hydroxyl- and the azo-group are in ortho-position to each other and R represents an unsubstituted naphthol radical, as well as an azo-dyestuff of the above general formula, which products represent dark colored powders easily soluble in water and dyeing wool blue to black tints.

10. Chromiferous azo-dyestuffs obtained by reacting in acid medium mixtures of chromium compounds of azo-dyestuffs and chromable azo-dyestuffs, which mixtures contain a chromium compound of an azo-dyestuff of the general formula

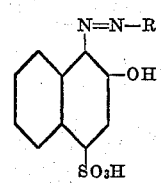

wherein R represents an unsubstituted naphthol radical, as well as an azo-dyestuff of the above general formula, which products represent dark colored powders easily soluble in water and dyeing wool blue to black tints.

11. Chromiferous azo-dyestuffs obtained by reacting in acid medium mixtures of chromium compounds of azo-dyestuffs and chromable azo-dyestuffs, which mixtures contain a chromium compound of the azo-dyestuff of the formula

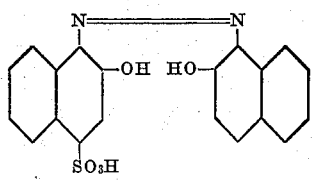

as well as the azo-dyestuff of this formula, which products represent dark colored powders easily soluble in water and dyeing wool blue to navy blue tints of very good fastness, particularly to rubbing, and excellent color in the artificial light.

12. Chromiferous azo-dyestuffs obtained by reacting with aliphatic acids mixtures of chromium compounds of azo-dyestuffs and chromable azo-dyestuffs, which mixtures contain a chromium compound of the azo-dyestuff of the formula

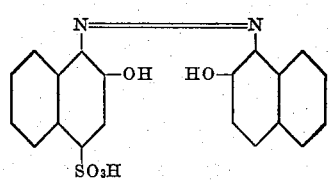

as well as the azo-dyestuff of this formula, which products represent dark colored powders easily soluble in water and dyeing wool blue to navy blue tints of very good fastness, particularly to rubbing, and excellent color in the artificial light.

FRITZ STRAUB.
HERMANN SCHNEIDER.